(12) United States Patent
Huber

(10) Patent No.: US 11,764,968 B2
(45) Date of Patent: Sep. 19, 2023

(54) VERIFICATION OF VALID CLIENT LIBRARY BINARY FILE ON CONNECTING TO SERVER SYSTEM

(71) Applicant: EMC IP Holding Company LLC, Hopkinton, MA (US)

(72) Inventor: Andrew R. Huber, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 313 days.

(21) Appl. No.: 17/148,420

(22) Filed: Jan. 13, 2021

(65) Prior Publication Data

US 2022/0224539 A1    Jul. 14, 2022

(51) Int. Cl.
| | |
|---|---|
| *H04L 9/32* | (2006.01) |
| *G06F 9/54* | (2006.01) |
| *H04L 9/40* | (2022.01) |
| *G06F 11/14* | (2006.01) |
| *G06F 16/13* | (2019.01) |
| *H04L 67/01* | (2022.01) |
| *H04L 67/133* | (2022.01) |

(52) U.S. Cl.
CPC ............ *H04L 9/3239* (2013.01); *G06F 9/547* (2013.01); *G06F 11/1453* (2013.01); *G06F 16/137* (2019.01); *H04L 63/0428* (2013.01); *H04L 63/10* (2013.01); *H04L 67/01* (2022.05); *H04L 67/133* (2022.05); *G06F 2201/84* (2013.01)

(58) Field of Classification Search
CPC ... H04L 9/3239; H04L 63/0428; H04L 63/10; H04L 67/01; H04L 67/133; H04L 67/34; G06F 9/547; G06F 11/1453; G06F 16/137; G06F 2201/84; G06F 21/51; G06F 8/60

See application file for complete search history.

(56) References Cited

U.S. PATENT DOCUMENTS

| | | | | |
|---|---|---|---|---|
| 9,177,153 | B1 * | 11/2015 | Perrig .................... | G06F 21/57 |
| 10,120,997 | B2 * | 11/2018 | Eshkenazi .............. | G06F 21/51 |
| 10,853,094 | B2 * | 12/2020 | Huber ..................... | H04L 67/01 |
| 10,877,750 | B1 * | 12/2020 | Connolly ............... | H04L 9/0897 |
| 2016/0350529 | A1 * | 12/2016 | Kerr ........................ | G06F 21/51 |
| 2018/0114000 | A1 * | 4/2018 | Taylor .................... | H04L 9/0643 |
| 2019/0332773 | A1 * | 10/2019 | Konetski ................ | H04L 63/126 |
| 2021/0173917 | A1 * | 6/2021 | Cheng .................... | G06F 21/53 |

FOREIGN PATENT DOCUMENTS

CN          107229860 A  * 10/2017  ............. G06F 21/51

* cited by examiner

*Primary Examiner* — Michael R Vaughan
(74) *Attorney, Agent, or Firm* — Staniford Tomita LLP

(57) ABSTRACT

Embodiments for validating a dynamically downloaded client-side library using a kernel that downloads the library and computing a hash value of the library using a nonce value received from a server and the library code. The kernel sends the hash value to the server with a file identifier. The server finds the identified library and compares the received hash value to its own computed value calculated over the file and using the same nonce value. If the client sends the correct value, then the server allows the application to connect to the server and use the server's services. If the client sends a value other than the value calculated by the server, the server closes the connection from the client and denies access to the application.

20 Claims, 8 Drawing Sheets

US 11,764,968 B2

VERIFICATION OF VALID CLIENT LIBRARY BINARY FILE ON CONNECTING TO SERVER SYSTEM

TECHNICAL FIELD

This invention relates generally to client-server network systems, and more specifically to validating client-side libraries in a dynamic download environment.

BACKGROUND

In client-server networks, client side applications and associated libraries run under a user's client computer operating system (OS) or web browser instead of on a web server as for server-side applications. Client-side applications require extra loading and initialization steps, but generally provide faster interaction and responsiveness. Similarly, client-side libraries are usually more flexible and easier to use in comparison with server-side libraries, thus many software vendors provide client-side libraries for download and use by client users.

When using a vendor supplied client-side library with a client-server application, the client-side library needs to be shown to be valid. This means that the library is as supplied by the vendor and has not been modified or replaced. A known standard way of proving validity is to provide a cryptographic signature of the client library binary file. A hash value using a standard hash algorithm (e.g., SHA256) is computed over the bits of the binary file, and the resulting hash value is cryptographically signed (encrypted) using the private key of a public-key/private-key pair belonging to the vendor. This proves that the hash value was generated by the vendor and correctly identifies the library file. The signed hash value and the public key of the key pair are provided with the client-side library, and when a user wants to install and use the client-side library, the user can compute the hash value of the binary file using the same hash algorithm. This user calculated hash value can then be compared to the cryptographically signed value provided by the vendor by decrypting the vendor supplied value using the provided public key. If the values match, the user is assured that the binary library file is the one produced by the vendor and can be safely installed and used.

This present solution works reasonably well in a static environment, where the client-side library is downloaded and installed by installation software and verification only needs to be performed once when the library is downloaded and installed. In such an environment the downloading and verification is done by the installation software. Neither the application nor the library is involved in the verification.

In a dynamic environment, however, there are several difficulties with this solution. For example, the client-side library can dynamically download a new version of itself when invoked by the client application. There is no installation software involved, and there is no software to receive the public key or the signature and to compute the hash value and verify the signature. The application does not even know that a new client-side library has been downloaded and will be used, so even if it did have the necessary capabilities it would not know to use them. Existing installation packages that cryptographically sign a hash value computed over the library file to prove its contents have not been altered thus suffer from the fact that the signature and the public key needed to decrypt the signature must be provided, and the installation package is required to actually do a verification. When an application uses the library, it does not necessarily know if the signature was indeed verified, or even if verified, whether the library was modified or replaced, since the installation software itself verified the signature.

Although some present solutions allow the library to perform some form of self-verification (e.g., a library might compute a checksum over itself when first initialized), these are not optimal. For example, OpenSSL FIPS libraries self-compute a hash value over their code when the routine to enter FIPS mode is invoked, which removes the need for the installation software to do validation, and removes the need for a cryptographic signature and a public key to be distributed. But since the library is validating itself, there is no guarantee that the library has not been modified or replaced. An attacker can modify or replace the library by simply modifying the self-verification step to always succeed or to always compute a known correct hash value. This present approach clearly does not provide full protection against attackers.

What is needed, therefore, is a client-side library validation method that validates a dynamically downloaded client-side library, and eliminates the need to distribute the signed hash value and the public key of the public-private key pair used to sign the hash value.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
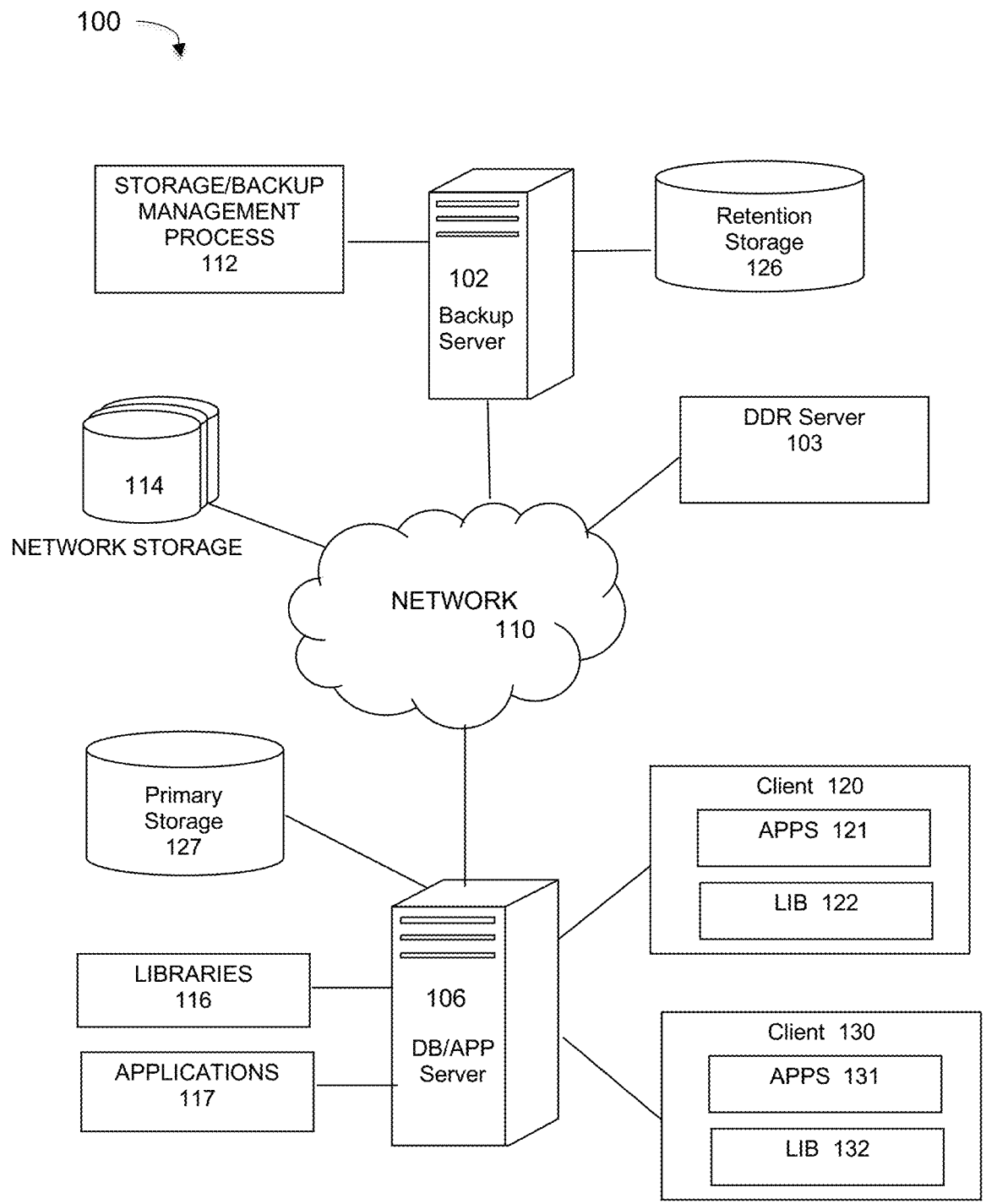
FIG. 1 is a diagram of a client-server network implementing a client-side library validation system and process, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), or metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a client-side library validation (or "verification") method that performs validation in cooperation with the server platform. The client side library comprises two parts: a new library and a kernel, which is a smaller, master piece that is responsible for downloading the new library. The new library contains all of the actual functionality implemented by the APIs. The kernel part is also responsible for computing a hash value of the new library and sending it to the server. The hash computation starts with a nonce value received from a server that results in a different hash value each time and proves that the hash was freshly computed and cannot have been calculated in advance. The kernel then sends the computed hash value to the server along with information identifying the particular library (such as the version number, build number, and patch number). The server then finds the identified library and compares this hash value to its own computed value calculated over the found library using the same nonce value. If the client sends the correct value, then the server allows the application to connect to the server and use the server's services. If the client sends a value other than the value calculated by the server, the server closes the connection from the client and denies access to the application.

FIG. 1 is a diagram of a client-server network implementing a client-side library validation process, under some embodiments. System 100 illustrates an example of a large-scale data processing storage system that may comprise a number of server and client computers coupled together in one or more public and/or private networks. As an example application, system 100 includes a storage server 102 that executes a data storage or backup management process 112 that coordinates or manages the backup of data from one or more data sources to storage devices, such as retention storage 126, primary storage 127, network storage 114, client storage, and/or virtual storage devices that may be provided. These storage devices serve as source storage devices that hold data to be backed up from the one or more data sources, such as database or other application server and client computers. Target storage devices for the backup data are part of the Data Domain server system 103.

As shown in FIG. 1, the network computers are coupled directly or indirectly to the network storage, servers (106) and clients and other resources through network 110, which is typically a public cloud network, but may also be a private cloud, LAN, WAN or other similar network. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are at least partially maintained and provided through a centralized cloud computing platform.

The data sourced by the clients may be any appropriate data, such as database data that is part of a database management system or any other appropriate application. Such data sources may also be referred to as data assets and represent sources of data that are backed up using process 112 and backup server 102. The data processed in system 100 and transmitted over network 110 may be stored in any number of persistent storage locations and devices. In a data backup environment, the backup process 112 causes or facilitates the backup of this data to other storage devices of the network, such as network storage 114, which may at least be partially implemented through storage device arrays, such as RAID components. System 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a network that includes, among other elements, a Data Domain Restorer (DDR)-based deduplication storage system, such as provided by DellEMC Corporation. However, other similar backup and storage systems are also possible.

For the example of FIG. 1, system 100 includes a database or application server 106 that is coupled to one or more client computers (e.g., 120 and 130) over private and/or public network links. Each client 120 or 130 may host one or more applications 121 or 131 which issue application programming interface (API) function calls to an application library 122 or 132 hosted on the respective client system. Although FIG. 1 illustrates an example embodiment showing two clients 120 and 130 and one server 106, it should be noted that system 100 may be scaled to any appropriate number of client-server computers, each with their own respective server-side or client-side applications and libraries. Thus, system 100 may comprise a number of application servers 106, a large number of distributed clients 120, one or more backup servers 102, and one or more data deduplication processes.

In an embodiment, at least some of the components such as client systems 120, 130, DB server 106 or process 112 support the DD Boost ("Boost") protocol for performing distributed data processing and storage in large data processing and storage systems. DD Boost is a protocol offered by Data Domain for performing distributed deduplication of user data sent from a client application to a Data Domain server for persistent storage. With DD Boost, an application 121 on a client 120 calls client library APIs that make remote procedure (RPC) calls to the Data Domain server. Client-side library code 122 cooperates with server-side code to perform distributed deduplication of user data to minimize the data that is actually sent to the server and to minimize the physical storage required to store the data. The architecture splits Boost into separate components, one on the client system and one on the server system.

The Boost architecture is a dynamic system in that it allows for dynamic replacement of client-side libraries. New libraries can be loaded from any accessible file system, such as from the Data Domain Restorer (DDR) server 102. As stated earlier, because of this dynamic download feature, certain validation or verification steps must be taken to ensure that a user knows when a new or replacement library is valid. Such steps are required to guard against corruption of binary files either on disk or in transit, or against alteration or replacement by an attacker.

Example embodiments will be described in relation to a Boost dynamically downloadable distributed deduplication client library as used in Data Domain systems. It should be noted, however, that embodiments are not so limited, and any other dynamically downloadable library used in any client-server network is also possible. A dynamic download environment refers to a process in which a client-side program can be updated, modified, re-versioned, patched, or otherwise changed after an initial installation by the user or system administrator. As software in large network applications is constantly updated and improved or fixed, the libraries 116 used by the applications 117 are correspondingly updated, usually on a regular periodic or relatively frequent basis. These updates are made on the server-side program code and provided to the client upon a subsequent use or access of this program by the client user. The updates are usually strictly controlled by the server administrator (vendor) to ensure that all client users access only validly released program code, and embodiments described herein provide an efficient mechanism by which client users can be assured that only valid client program code is downloaded from the servers to the client computers.

Figure 2A:
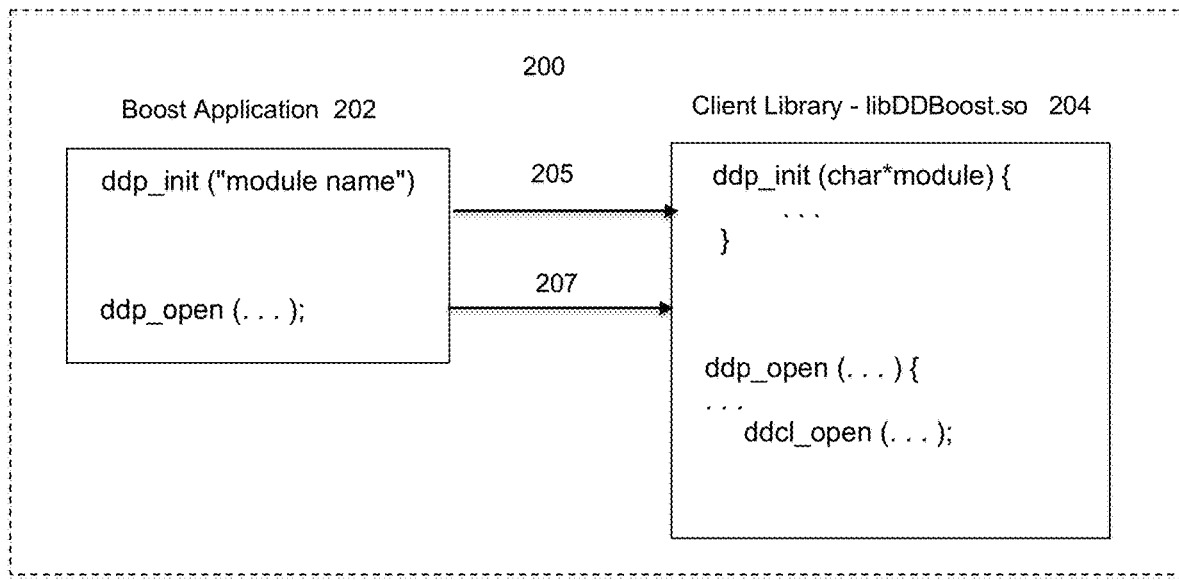
FIG. 2A illustrates an example client library that may be used in a client-side library validation process, under some embodiments.

FIG. 2A illustrates an example client library that may be used in a client-side library validation process, under some embodiments. Client 200 of FIG. 2A illustrates an embodiment of the FIG. 1 client system 120 with applications 121 being a Boost application 202 and library 122 being client library 204. The example client library 204 is a Data Domain DD Boost client library ("libDDBoost.so") for receiving calls from application 202 to access the functions of the DD Boost distributed deduplication protocol. The DD Boost client library 204 comprises middleware which provides services beyond those services which the client operating system provides to applications, such as application 202, that are hosted on the client. In general, the application 202 is any application program written or installed by the user, and is typically a backup application as for system 100, but may be any appropriate application. The application 202 generally stays the same and is not affected by the client library 204 that is used, or by any library validation process described below. The application 202 and library 204 are shown for purposes of illustration only, and any other application and library may be used.

The client library 204 may be provided as a library that may be obtained from any appropriate source or vendor. The library may be cryptographically signed by the vendor by computing a hash value (e.g., SHA256) and encrypting this hash value using the private key of a public/private key pair. The cryptographic signature and the public key are distributed with the library so the library can be verified.

Figure 2B:
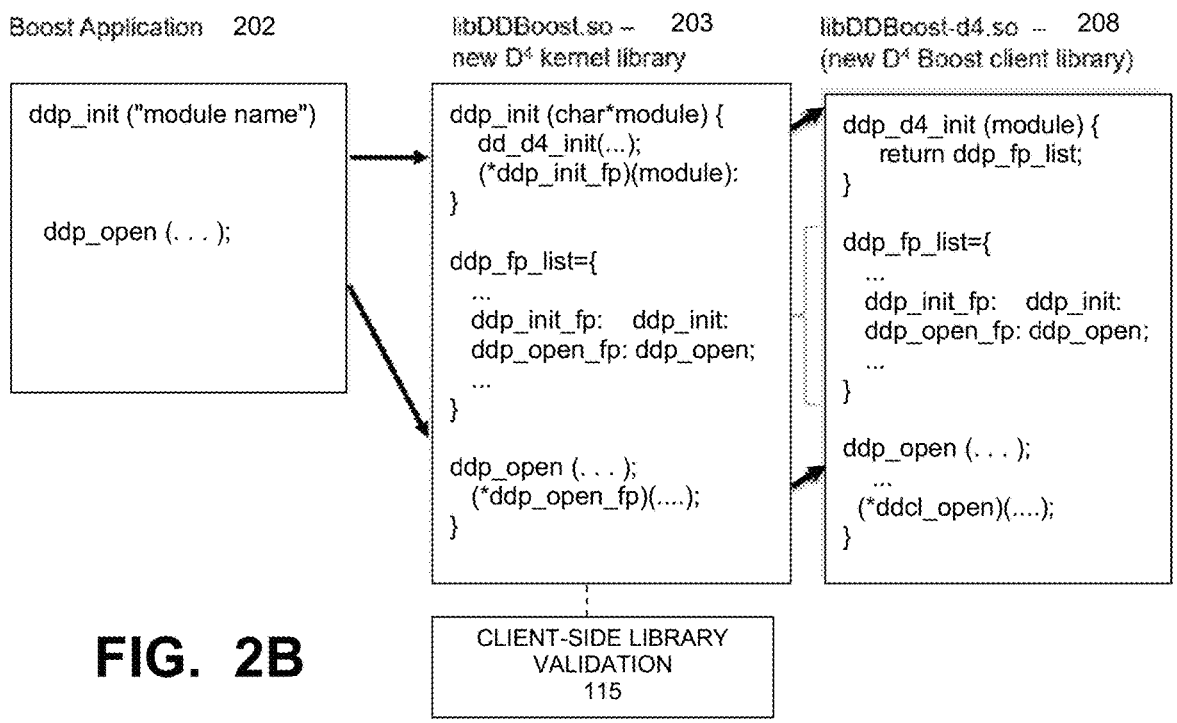
FIG. 2B illustrates a dynamically downloadable Boost library accessed through a re-direction component, under some embodiments.

In an embodiment, such as in a DD Boost or similar system, the client library is provided as a dynamically downloadable client library. In a DD Boost system, as shown in FIG. 2B, the client library is downloaded to the client using a kernel library function that functions as a re-direction layer that passes Boost API calls from the application to a standard Boost Library. FIG. 2B illustrates a downloadable Boost library accessed through a re-direction layer, under some embodiments. For the embodiment of FIG. 2B, a re-direction layer 203 passes Boost API calls from the (unchanged) application 202 to the standard Boost Library 208. For this embodiment, the library (e.g., 204) is replaced with two different library components 203 and 208. One component comprises a small library referred to as a D4 kernel library, 203, that resides on the client and embodies an initialization routine. The other component of the library referred to herein as a D4 Boost client library, 208, may reside on the client 120 or elsewhere, as on a server such as server 106, for example. The D4 Boost client library 208 comprises a modified version of the standard Boost client library 204. The D4 boost kernel 203 includes logic to determine the appropriate version of the client library to use.

As shown in the example of FIG. 2A, a first API call 205 that an application 202 makes to the client library 204 must be to an initialization routine, i.e., ddp_init ("module name"), where the parameter "module name" is the name of the calling application and is used for identification of the calling application. This API initializes various structures in the Boost client library 204 needed for subsequent operations. Following initialization, other calls, e.g., ddp_open ( . . . ), 207, may be made to open, create, write and read files, and so on. These calls invoke the corresponding implementation in the Boost client library 204.

When an application 202 invokes Boost via the standard ddp_int API, the call is handled by the D4 kernel 203 (kernel library), which determines the version of the D4 Client Library that should be used, and its location. The kernel may do this, for example, by connecting to a predetermined site to see if there is a more recent version of the D4 Boost Client Library for use with the initializing application or client, and, if so, downloading that more recent version to replace the existing version. Once the appropriate client library is determined, the D4 Kernel invokes at 203 the appropriate initialization routine to initialize that client library. This is shown by the kernel 203 calling dd_d4_init (module, . . . ) in the D4 Boost client library 208.

After initialization, the D4 kernel 203 serves as a re-direction layer that passes Boost API calls from the application 202 to the Boost Library 208. During its initialization, the D4 kernel library 203 invokes the new dd_d4_init routine in the client library 208. This causes the D4 Boost client library to create and return a vector of function pointers, as ddp_fp_list={ . . . }, with one function pointer entry for each of the standard Boost APIs pointing to computer code in the D4 Boost client library 208 for performing the corresponding function. The D4 kernel library 203 saves the list of function pointers and uses the returned function pointer to the ddp_init routine in the client library to invoke that routine for the appropriate D4 Boost client library initialization. When the D4 Boost client library 208 responds to the ddp_init call and returns control to the D4 kernel, the D4 kernel ddp_init routine returns to the application. All further Boost API calls made by the application go to the D4 kernel library 203, as illustrated by the ddp_open in FIG. 2B. The D4 kernel 203 thus effectively acts as a redirection mechanism passing the call through to the Boost client library that was discovered and connected to the application by the original ddp_init call by using the returned pointers. With this redirection mechanism 203, the D4 Boost client-side code is no longer constrained to use only the version of the D4 Boost library that may be currently in place on the client system 120. Removing this restriction allows the client to determine which version of a Boost library to use by the initialization routine in the new Boost D4 kernel library component 203.

Some embodiments of the kernel library process are described in U.S. Pat. No. 10,853,094 issued on Dec. 1, 2020, and which is assigned to the assignee of the present application, and further which is incorporated in its entirety herein by reference.

When client library 208 is downloaded to the client, a client-side library validation routine or function performs certain validation steps to help assure the user that the downloaded client-side library is validly provided by the vendor and has not been improperly modified. In an embodiment, a library validation procedure runs inside of or as part of the kernel library 203. In a Boost system, the kernel library 203 invoked via the ddp_init call (for example) executes the library validation process 115 so that all of the application and Boost library code runs in the same process. After the kernel library 203 downloads the new client library, another routine in the D4 kernel library performs the validation steps, such as the computing of the hash value over the server provided nonce and the new library, and sending a remote procedure call with the hash and other information back to the server for validation. Function or processing component 115 thus embodies a cooperative self-verification process for validation of dynamically downloadable client-side files.

Figure 3:
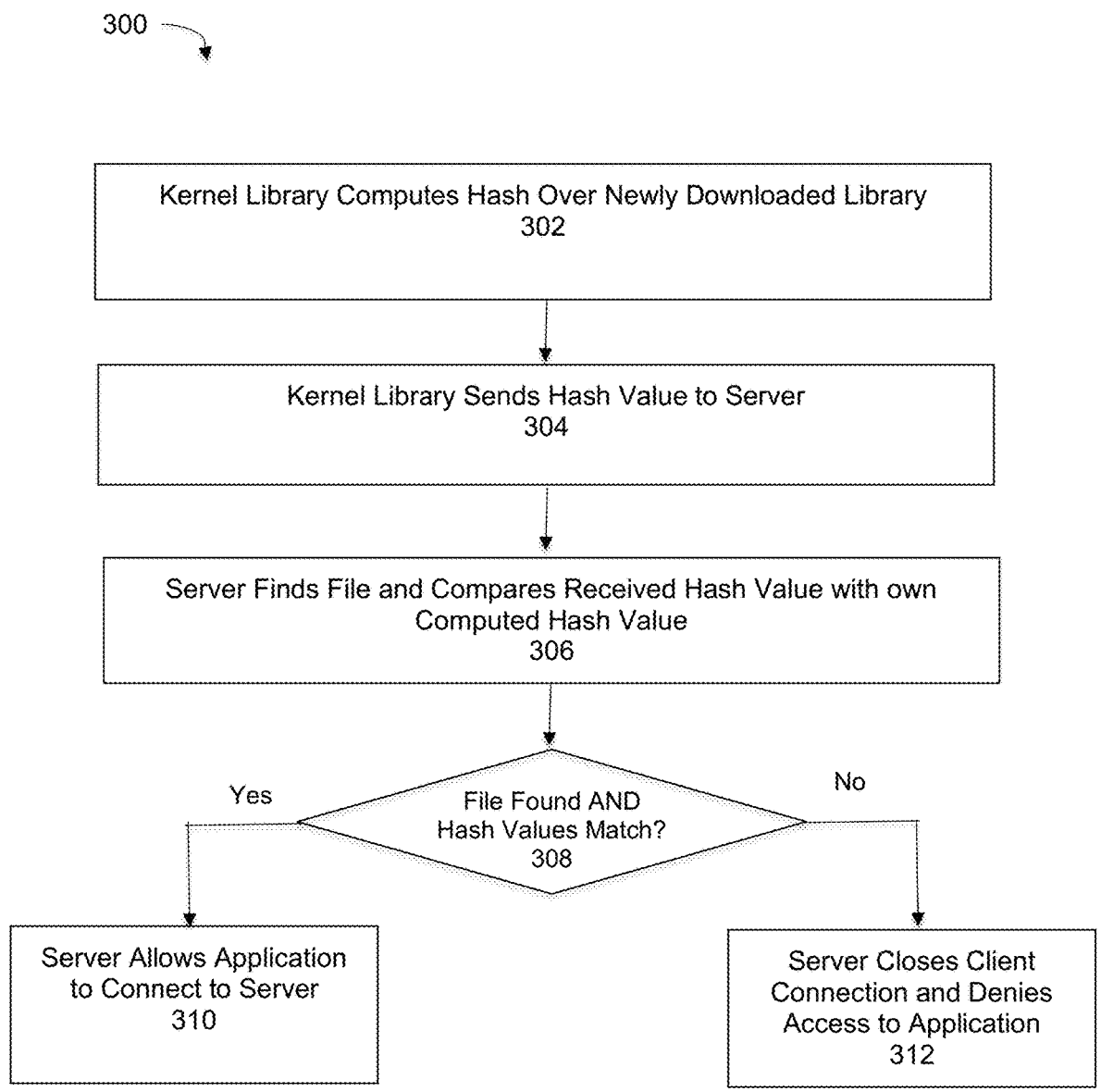
FIG. 3 is a flowchart that illustrates an overall method of validating a client-side library, under some embodiments.

FIG. 3 is a flowchart that illustrates an overall method of validating a client-side library, under some embodiments. As shown in process 300, the kernel library computes the hash over the newly downloaded library (such as through kernel library component 203), 302. The hash computation starts with a nonce value received from the server that results in a different hash value each time and proves that the hash was freshly computed and cannot have been calculated in advance. The kernel library then sends the computed hash value to the server along with information identifying the particular library (such as the version number, build number, and patch number), 304. The server uses this information to find the file in its own directory and then compares the client computed hash value to its own computed value for the found file using the same nonce value it generated, 306. If the file is found and the client sends the correct value as determined in decision block 308, then the server allows the application to connect to the server and use the server's services, 310. If the file is not found by the server or if client sends a value other than the value calculated by the server, the server closes the connection from the client and denies access to the application, 312. The code in the newly downloaded library (302) cannot be used until the library is validated (310).

Process 300 of FIG. 3 thus constitutes a cooperative self-verification method for validation of a client-side library using both client and server processes. This method effectively solves the problem of validating the dynamically downloaded client-side library and proves the validating hash value was freshly calculated as opposed to being old or recycled. It eliminates the need to distribute the signed hash value and the public key of the public-private key pair used to sign the hash value. It also eliminates the need for a signed hash value to be generated, or for use of a public-private key pair.

Figure 4:
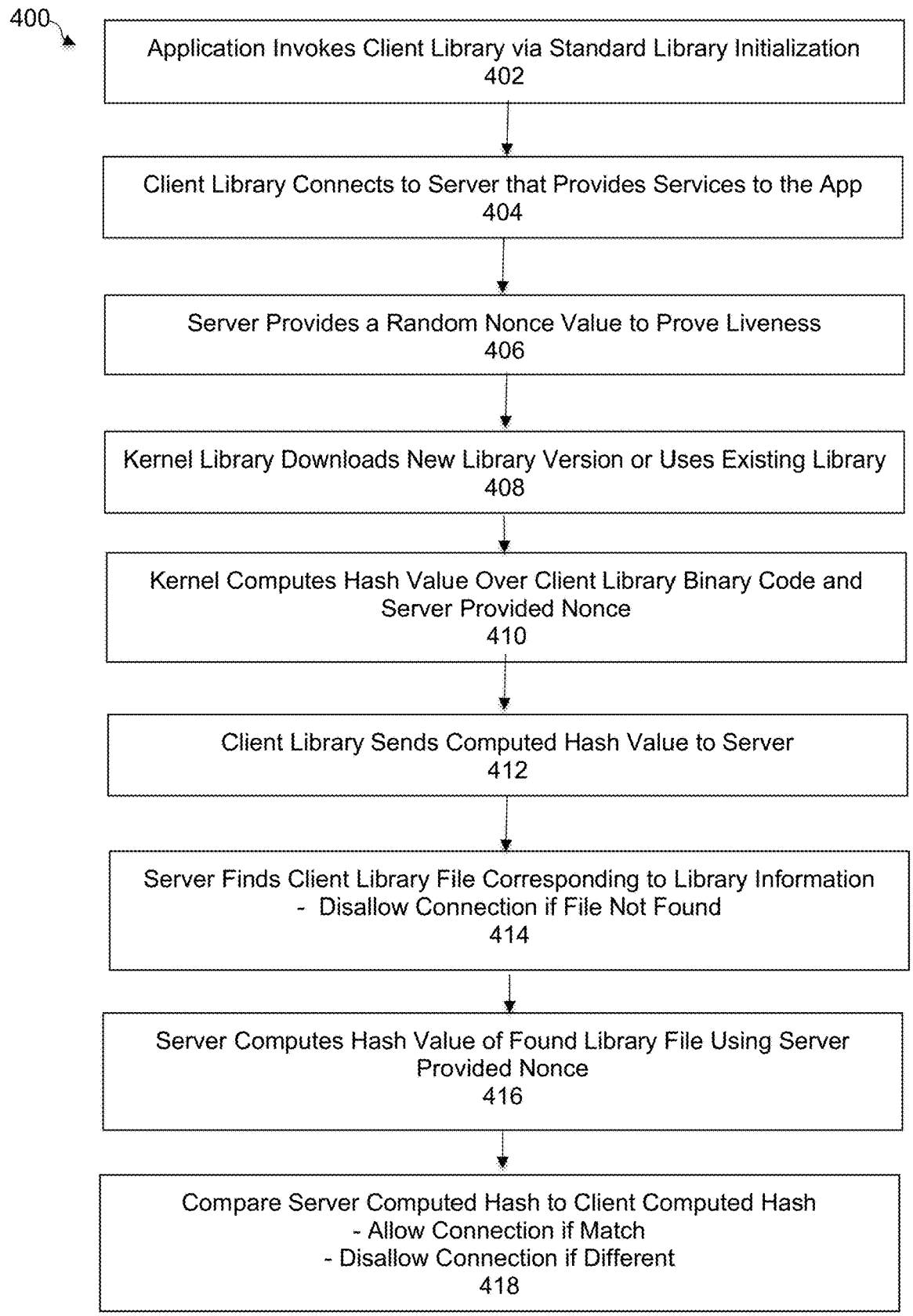
FIG. 4 is a flowchart illustrating a more detailed method of validating a Boost client-side library, under some embodiments.

A more detailed explanation will be provided with reference to FIG. 4, which is a flowchart illustrating specific detailed steps for validating a Boost client library, under some embodiments. As shown in FIG. 4, process 400 begins with the client library being invoked by the application via the standard library initialization sequence, 402. The client library is then directed to connect to the server system that will provide the services (e.g., data storage and retrieval, etc.) to the application, 404. As part of the connection sequence, the server provides a random nonce value which is used to prove liveness of the computed hash value, 406. As part of the connection sequence, the client library may optionally download a new client library version to replace the existing client library, or it may use the existing client library, either or which will be validated, 408. A new library may be downloaded directly from the server, or from any other place the server directs (some other server system, a local directory, an NFS or CIFS mounted directory, etc.).

As part of the connection sequence the library kernel portion of the client library computes a hash value over the client library binary code of the newly downloaded library (if one was downloaded in step 408), or over the original library, 410. The hash value may be computed using a standard hash algorithm such as SHA256, or any other appropriate hash algorithm, such as SHA384 or SHA512, SHA-1, MD5, etc.

The first input to the hash calculation is the random nonce value received from the server in step 406. Including the nonce in this way guarantees the hash value is different each time and that the hash value is freshly computed. The nonce value can be generated using any appropriate random number generator, and is used for liveness and enhanced security. Since a hash value for a given binary file is constant and known, an attacker could theoretically produce a modified binary that produced this hash value. To counter this, verification salt may be added to a file until a desired hash value produced. However, sending a random nonce value to begin the hash calculation more effectively prevents this possibility. The nonce value is different each time and produces a completely different hash result each time. This also proves the hash is calculated at connection time and is not pre-computed.

In addition to the nonce value, the new library or the original library comprises the remainder of the input to the hash calculation. This computed hash value is then sent to the server by the client library, 412. Along with the hash value the message contains information identifying the specific revision of the client library, such as major version number, minor version number, patch release number, and engineering build number, and so on. This message is encrypted so that the computed hash value cannot be read by eavesdroppers or attackers. For example, the calculated hash value can be sent in encrypted RPC to the DDR server with library version info: [major rev, minor rev, build #, patch], or any similar information.

Upon receipt of the message comprising the hash value and library information, the server finds the client library file corresponding to the version information included in the message, 414. If no appropriate library file is found, the validation process fails and the connection to the client is disallowed. Thus only known libraries can be downloaded and validated. For a found library, the server uses the nonce value sent to the client and the client library binary file and computes the hash value of the client library file it finds, 416. It should be noted that this step of server computation of the found client library can be done by the server when it provides the nonce value (step 406) in parallel with the downloading of the client library and the client hash value calculation, thus the server's value may already be computed by the time the client's message is received.

The server computed hash value is then compared to the client computed hash value sent by the client-side library, 418. If the library version file was found on the server and the value received from the client matches the value calculated by the server, the client-side library is valid, the connection establishment is allowed to complete, and the client application can access the server using the connection. However, if the library version file was not found on the server or the server's calculated hash value does not match the value received from the client, the validation fails and the connection is closed. The client will not be able to access the server using that client-side library.

As shown with reference to FIG. 2B, embodiments in a Boost environment may use a kernel library redirection component to call libraries from a Boost application. FIGS. 5A to 5E illustrate a process of validating a downloadable Boost library using the re-direction layer of FIG. 2B, under an example embodiment.

Figure 5A:
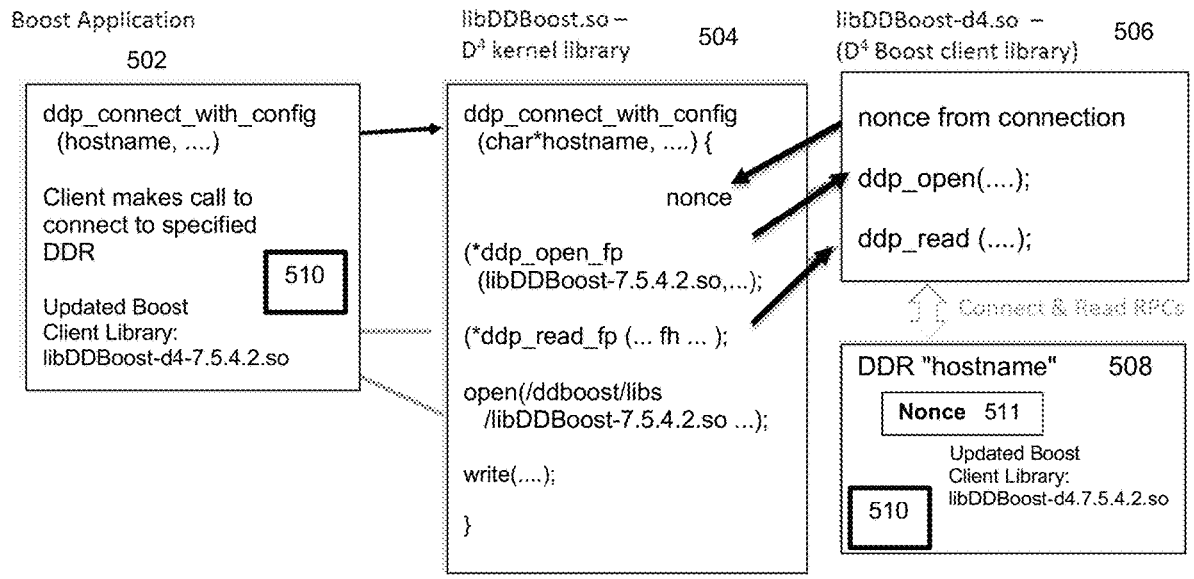
FIGS. 5A, 5B, 5C, 5D, and 5E illustrate a process of validating a downloadable Boost library using the re-direction component of FIG. 2B, under an example embodiment.

As shown in FIG. 5A, the server 508 has the downloadable library "libDDBoost-d4-7.5.4.2.so" which is to be accessed by the Boost application 502. The D4 kernel 504 opens and reads this library file 510 specified on the DDR server "hostname" and writes it on the client 502. As part of this connecting step, a nonce 511 generated by the server 508 is sent back to the kernel 504. This sequence of client-server acts with the kernel and client library of FIG. 5A corresponds to steps 402 to 408 in FIG. 4, and results in a new library obtained from server being copied down to Boost application 502 of the client.

Figure 5B:
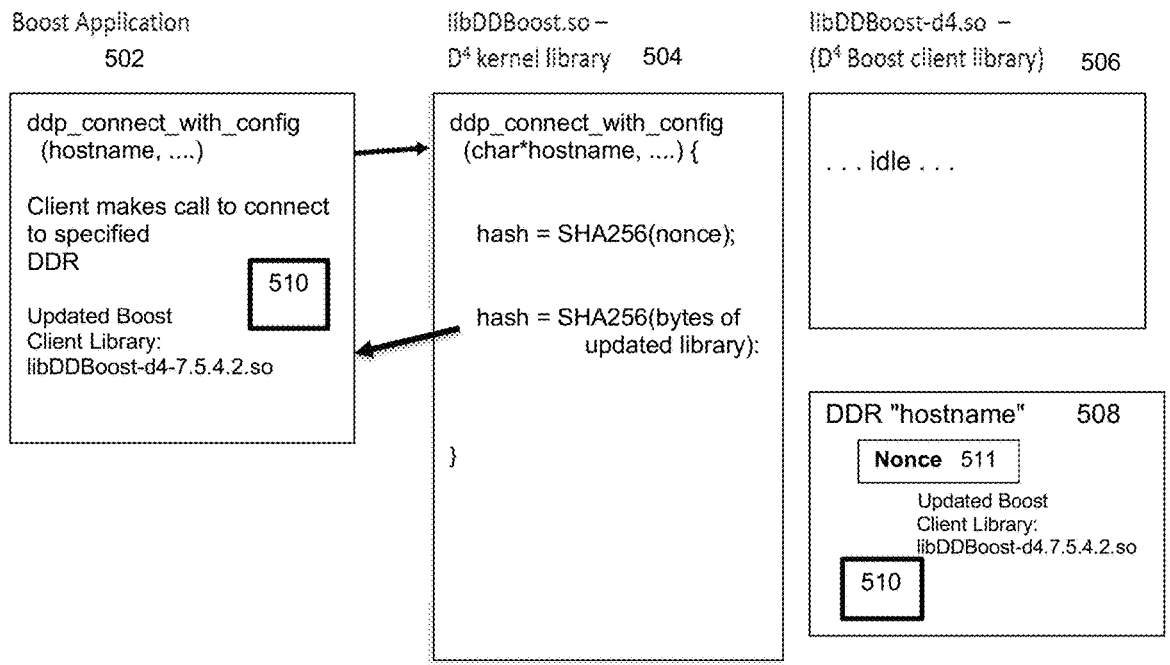

As shown in FIG. 5B (and corresponding to step 410 in FIG. 4) the kernel 504 then computes the hash value of the downloadable library file (libDDBoost-d4-7.5.4.2.so). This hash value includes the nonce 511. As stated above, the nonce 511 is a unique random value generated by server upon each download or access of a new library file. The client library 506 is idle during this step, and the kernel computes hash[nonce+updated client library]. The computation of the hash in the D4 kernel library 504 represents one example of code execution for component 115 of FIG. 2B.

An example of the hash calculation for FIG. 5B can be implemented (at least in part) by the following example programming code:

```
Sha256_start(nonce)
Sha256_update(first bytes of library)
. . .
Sha256_update(last bytes of library)
Hash = Sha256_final( )
```

The hash calculation can thus be implemented through a series of function calls, and no value/output is produced until the Sha256_final( ) call. Alternatively, it may be done as a single call, but depending on the cryptographic library or libraries used to compute the hash, any number of calls may be used.

As stated before, use of nonce guarantees a different value each time the hash is computed. The nonce can be input first to the hash calculation before the updated client library bytes to ensure that first part to the computed hash value is always unique and different to any later hash values calculated for different nonce values, even if the updated client library hash may remain the same.

Figure 5C:
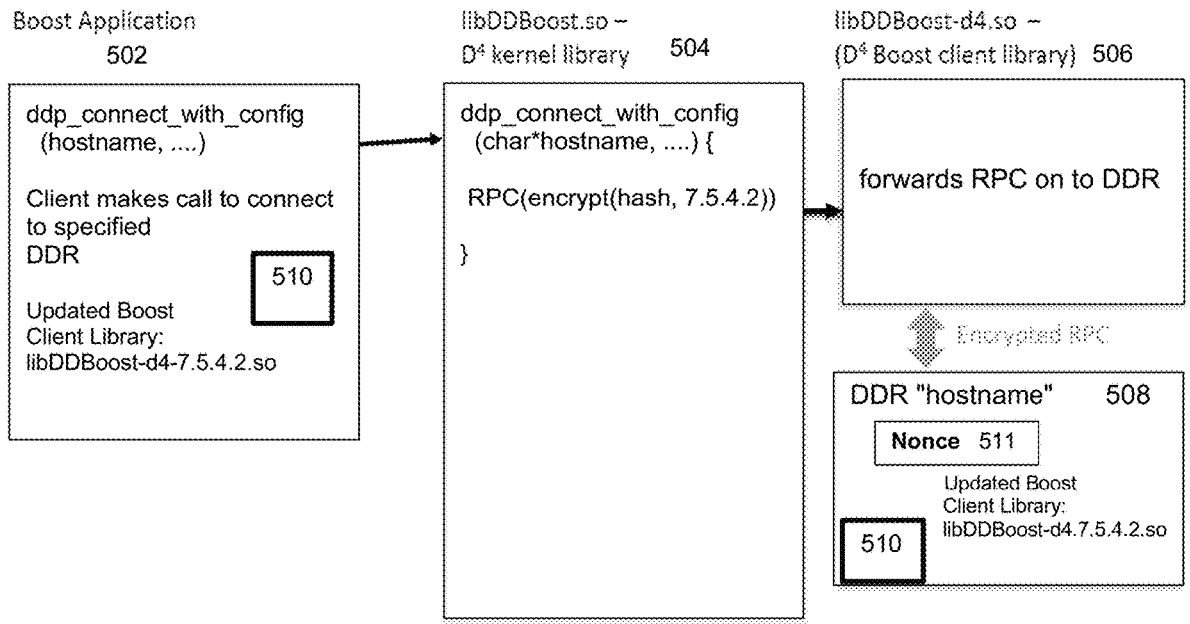
Figure 5D:
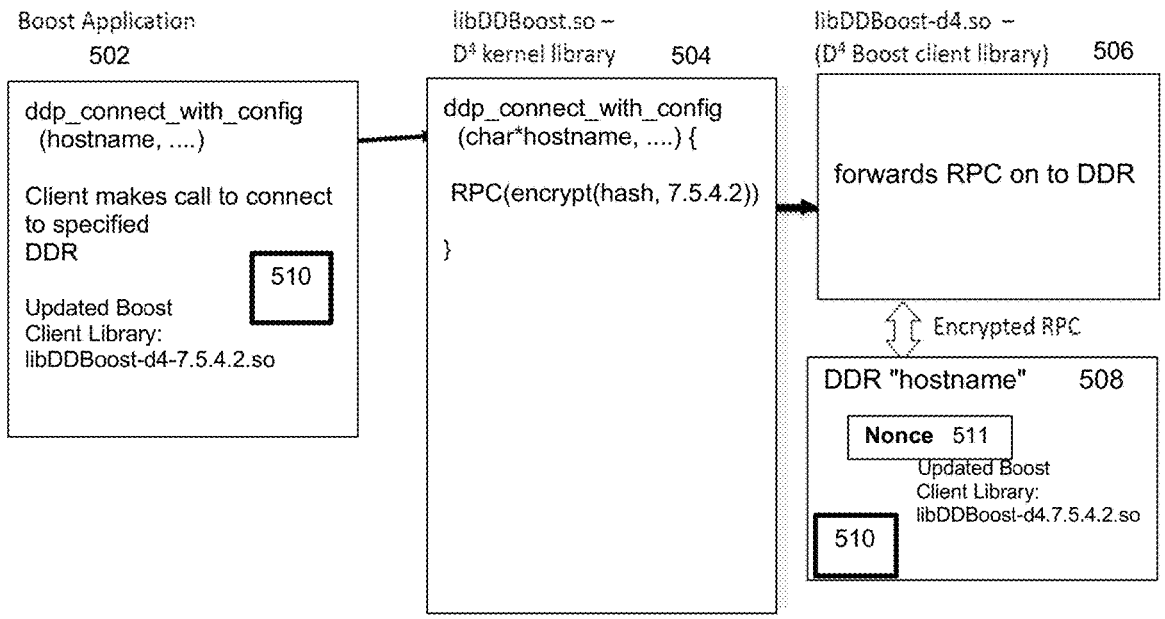

As shown in FIG. 5C (and corresponding to step 412 in FIG. 4), the kernel 504 sends the computed hash plus the library information (e.g., version number) back to the server 508. This is transmitted to the server in an encrypted RPC to ensure security. As shown in FIG. 5D (and corresponding to step 414 of FIG. 4), the server decrypts the encrypted RPC and uses the version information to find the library binary file that the hash was computed over. If the file is not found, the validation fails.

Figure 5E:
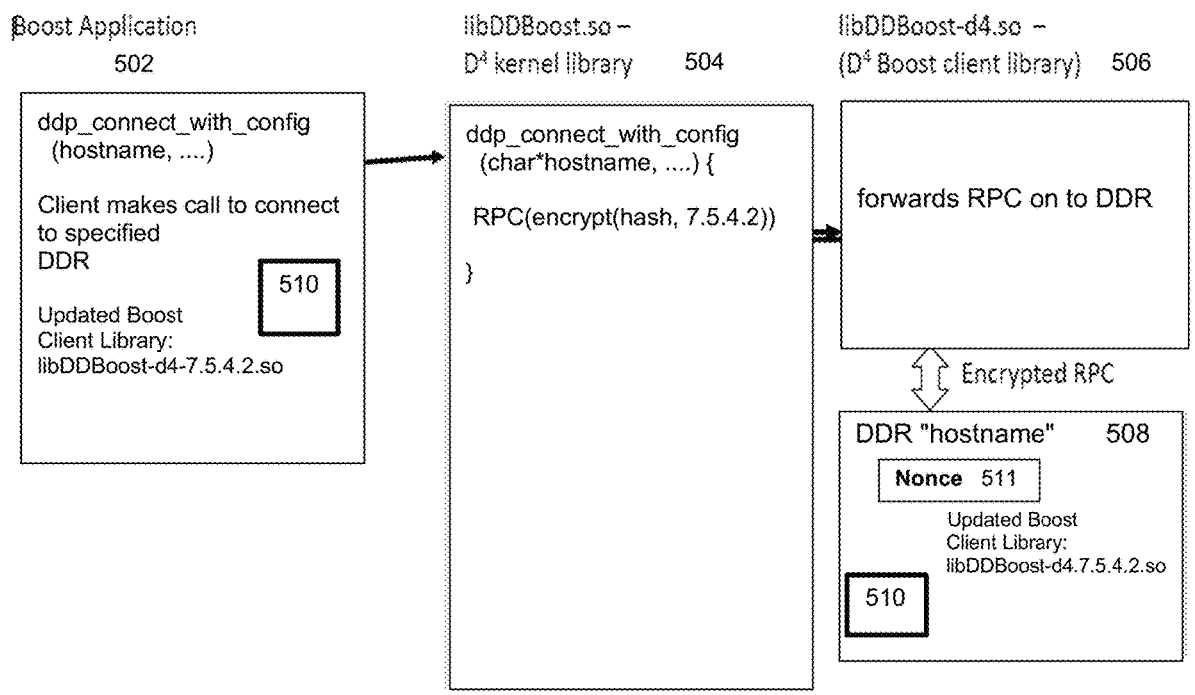

As shown in FIG. 5E (and corresponding to step 416-418 of FIG. 4), the server computes the hash from the nonce sent to the client and the found library file. If the server's hash value matches the hash from the client, the validation succeeds, the client library is accessible to the application 502. Otherwise, if the file is found, but the client hash does not match the server computed hash the validation fails.

In general, the process of FIG. 4 applies in the case where the client-side library is a new, dynamically downloaded client library that was loaded from the server by a previous version of the client library. This verification technique also applies when a new library is not downloaded, in which case, the original library is validated using the same procedure. Validation when a new client library is not dynamically downloaded has the same advantages over having the verification done by installation software, that is, no additional signature or key needs to be provided. In addition, the validation can be done every time the client library is invoked, instead of just once when the library is first installed. This would detect any changes or modifications made after installation.

The validation process has been described as being performed when the client library first connects to the server, however, embodiments are not so limited. The validation process can be performed at any time or even multiple times for a client library currently being used on a client. For example, the validation process 400 can be performed on a regular periodic basis (e.g., every five minutes, hourly, daily). It may also be event driven, such as on the basis of a number (n) of calls to the server or on detection of a potential fault or intrusion event. It can also be done on a random basis. The scheduling of the validation process may thus be dictated by the user or system administrator based on any requirements or constraints of the system.

Embodiments of the validation process 400 can also be used to limit specific legal versions of the client library the server allows to be accessed. For example, if there is some library version the server does not want to support (such as if it has a known bug or security weakness) then removing the entry for that version from the server's directory containing library files means that version will not be allowed to access the server. The validation process thus allows for efficient versioning and inventory control by providing an intermediate validation of finding the appropriate client library in response to the client's request.

In an embodiment, the validation process can also be used to help with enforcing access rights within an organization. Such user access can be implemented and controlled by placing appropriate access rights on the client library file. Thus, if the file were present, and user "A" was given read/execute access to it, then he or she could validate against the file and use it. However, if another user "B" was not given read/execute access to the file, then when the server-side check code computes the hash for that library file for user B, it could cause the validation to fail because, although the file existed and user B computed the correct hash value, that user was denied access. Access controls on the library files can also be used when the client library first tries to download the file to deny access to a user.

With respect to the applications that use the client-side library, the verification process is generally invisible and has no effect on the applications themselves. In addition, the validation function can be tailored to be invoked for certain applications and not for others. Similarly, accommodation may be made to allow applications to turn on or turn off the validation process for any client library they may use.

Because validation is based at least in part of the server finding the client-side library, a directory of allowed client libraries must be maintained on the server or a server-accessible store. This allows the requested connection to be denied if the client library version is not found by the server, and allows for strict control by including or removing appropriate versions from the directory list.

Embodiments of the cooperative self-verification process for dynamically downloaded client-side libraries provides several distinct advantages over present methods. These include not requiring providing a signature value for downloadable libraries, not requiring a public key for the verification process, and not needing installation or other software to perform the verification. Verification can be done dynamically every time the library is used, and the method protects against library modifications after an initial installation, and a library can be verified regardless of its origin or download source.

Embodiments overcome the disadvantages with present client-side library distribution that do not eliminate a major user concern of possible malware or other rogue software in vendor distributions. Users of vendor supplied client-side libraries are presently not assured of receiving officially released software, as no standard installation process or package is used and there is no way to do traditional signature verification. Such validation of dynamically downloaded client-side libraries is addressed in embodiments of the cooperative self-verification process described herein.

Embodiments are generally described with respect to validation processes applied to middleware, such as libraries used by applications that are separate from applications and that are provided by some other source/vendor than the source of the application, and also for cases where this middleware is generally transparent and can be replaced without the application's knowledge. Although embodiments are described with respect to certain library examples, embodiments are not so limited, and any similar or other middleware can also be used.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 6:
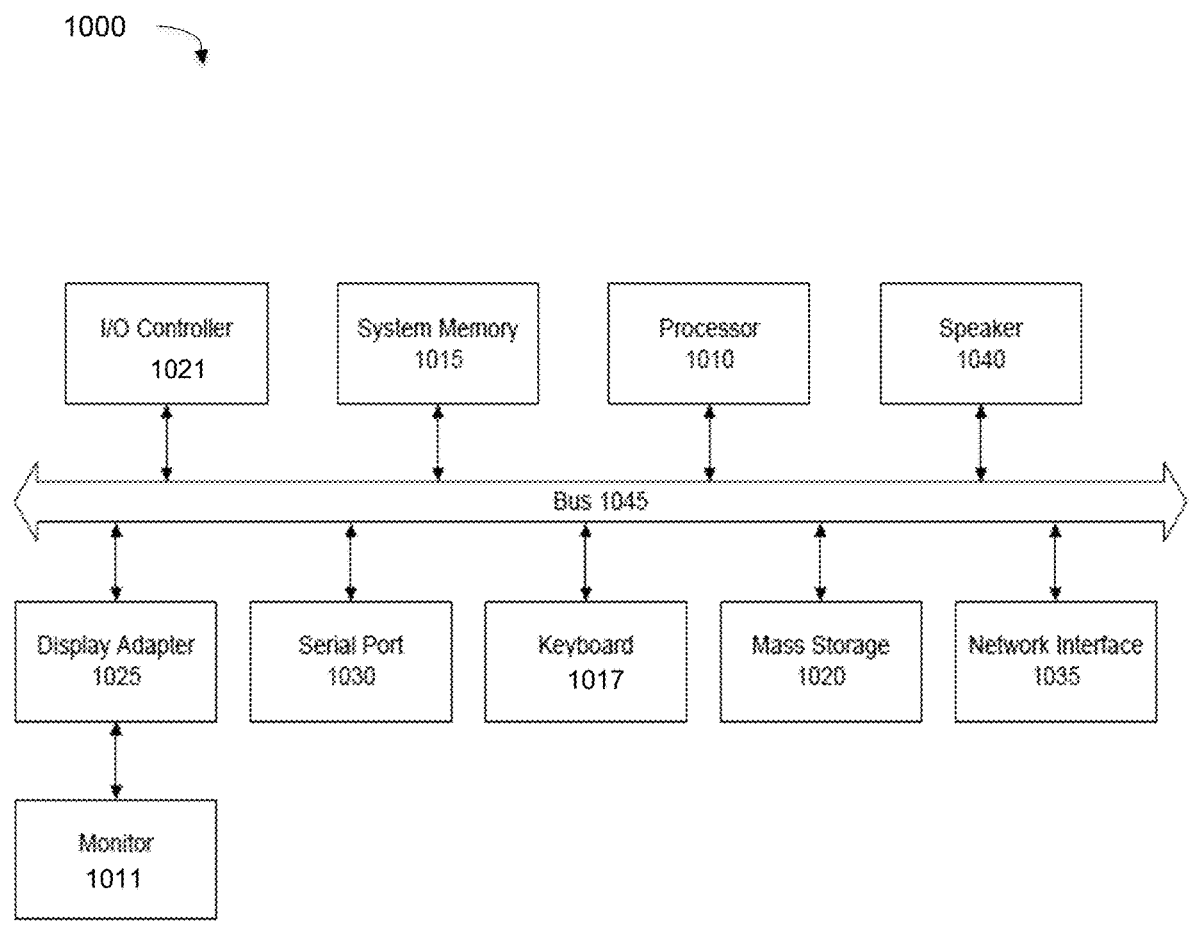
FIG. 6 is a system block diagram of a computer system used to execute one or more software components of a client-side library validation system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
generating a nonce value at a server in a client-server network;
downloading, to a client coupled to the server, a library and the nonce value;
computing, at the client, a first hash value whose hash input comprises the nonce value and binary code of the library;
sending from the client to the server the first hash value and a library identifier;
finding on the server the library referenced by the library identifier;
computing, at the server, a second hash value of the nonce value and binary code of the found library referenced by the library identifier; and
allowing use of the library by the client as a middleware component that can access the server if the library referenced by the library identifier is found by the server and if the second hash value matches the first hash value, otherwise denying access by the client to the library provided by the server.

2. The method of claim 1 wherein the library is used by one or more applications executed on the client.

3. The method of claim 1 wherein the library is downloaded from a location designated by the server and is provided separately from the applications and can be replaced without awareness by an application.

4. The method of claim 1 wherein the nonce value is randomly generated by the server upon each access by the client to the library provided by the server.

5. The method of claim 1 further wherein the library identifier comprises a value representing a major version number, a minor number version number, a patch number, and an engineering build number.

6. The method of claim 5 comprising sending the first hash value and the library identifier from the client as an encrypted remote procedure call to the server.

7. The method of claim 6 further comprising performing a local directory lookup on the server computer to determine if the library referenced by the library identifier is found by the server.

8. The method of claim 3 wherein the client-server network comprises part of a data deduplication backup system, and wherein the application comprises a backup application.

9. The method of claim 8 wherein the library comprises a set of client library application programming interfaces (APIs) that make remote procedure (RPC) calls to the server from the client to perform distributed deduplication of user data to minimize an amount of data sent to the server and to minimize the physical storage required to store the data by the backup application.

10. A method comprising:
accessing a library downloadable to a client coupled to the server by a kernel library component;

receiving a nonce value generated by the server;
calculating first hash value using the nonce value and binary code of the library; and
sending the hash value to the server with library identifier to allow the server to find the library identified by the library identifier, compute a second hash value using the nonce value and binary code of the identified library to verify that the first hash value matches the second hash value; and
receiving allowance to use the library if the second hash value matches the first hash value.

11. The method of claim 10 wherein the library comprises a middleware component that can access the server and is downloaded from a location designated by the server and is provided separately from the applications and can be replaced without awareness by an application.

12. The method of claim 11 wherein the library is used by one or more applications executed on the client, and wherein the library identifier comprises a value representing a major version number, a minor number version number, a patch number, and an engineering build number.

13. The method of claim 10 wherein the client-server network comprises part of a data deduplication backup system, and wherein the application comprises a backup application.

14. The method of claim 13 wherein the library comprises a set of client library application programming interfaces (APIs) that make remote procedure (RPC) calls to the server from the client to perform distributed deduplication of user data to minimize an amount of data sent to the server and to minimize the physical storage required to store the data by the backup application.

15. A system comprising:
a server-side component generating a nonce value at a server in a client-server network;
a library downloadable to a client coupled to the server;
a kernel downloading the library to the client and calculating first hash value using the nonce value and binary code of the library, and sending the hash value to the server with a library identifier; and
an additional server-side component identifying the library identified by the library identifier, computing a second hash value using the nonce value and binary code of the identified library, comparing the first hash value to the second hash value, and allowing use of the library by the client if the second hash value matches the first hash value, otherwise denying access by the client to the library provided by the server.

16. The system of claim 15 wherein the library comprises a middleware component that can access the server and is downloaded from a location designated by the server and is provided separately from the applications and can be replaced without awareness by an application.

17. The system of claim 16 wherein the library is used by one or more applications executed on the client, and wherein the library identifier comprises a value representing a major version number, a minor number version number, a patch number, and an engineering build number.

18. The system of claim 15 wherein the nonce value is randomly generated by the server upon each access by the client to the library provided by the server.

19. The system of claim 15 wherein the client-server network comprises part of a data deduplication backup system, and wherein the application comprises a backup application.

20. The system of claim 19 wherein the library comprises a set of client library application programming interfaces (APIs) that make remote procedure (RPC) calls to the server from the client to perform distributed deduplication of user data to minimize an amount of data sent to the server and to minimize the physical storage required to store the data by the backup application.

* * * * *